Patented Sept. 20, 1932

1,878,243

UNITED STATES PATENT OFFICE

LEOPOLD LASKA, ARTHUR ZITSCHER, WILHELM CHRIST, AND ADOLF PETZOLD, OF OFFENBACH-ON-THE-MAIN, GERMANY, ASSIGNORS TO GENERAL ANILINE WORKS, INC., OF NEW YORK, N. Y., A CORPORATION OF DELAWARE

PROCESS FOR MANUFACTURING AZODYESTUFFS

No Drawing. Application filed November 12, 1928, Serial No. 318,993, and in Germany December 13, 1927.

Our invention relates to a process for manufacturing azodyestuffs corresponding to the general formula:

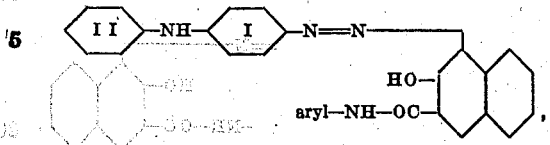

in which formula the naphthalene and the two benzene nuclei may contain further substituents other than a sulfonic or carboxylic group and the benzene nucleus signified by II may be replaced by a naphthalene nucleus. Our process consists in combining in substance or upon a substratum a 4-diazo-N-nitroso-diarylamine compound not containing a sulphonic or carboxylic group and probably corresponding with the general formula:

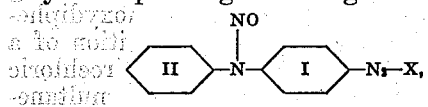

in which formula X means an anion and the two benzene nuclei may contain further substituents and the nucleus signified by II may be replaced by a naphthalene nucleus, with an arylide of 2.3-hydroxynaphthoic acid and in eliminating the nitroso-group from the molecule of the azodyestuffs formed. In this manner on the substratum applied dark violet to blue shades of an excellent fastness are obtained. The diazonitrosodiphenylamine compounds, which have not been used hitherto for the production of azo-dyestuffs insoluble in water, are distinguished by their particular capacity for combining and the stability of their solutions, a fact, which is of importance for producing ice colors by means of a standard bath. These diazonitrosodiphenylamine compounds are obtainable by the action of two molecular proportions of an alkali nitrite on one molecular proportion of an aminodiphenylamine compound in a mineral acid solution.

The elimination of the nitrosogroup from the molecule of the primarily formed azodyestuffs is effected by means of saponifying agents, such as alkalies or mineral or organic acids, advantageously with addition of a reducing agent such as hydrosulfites, dextrose, sulfites, bissulfites, hydroxylamine or hydrazine. As particularly suitable there may be named alkali metal sulfides having the double effect of a saponifying and of a reducing agent. Advantageously one may add an emulsifying agent such as soap to the alkaline saponifying bath.

Suitable for the present process are nitrosodiazo-compounds of 4-aminodiphenylamine itself and of its substitution products, such as 4-amino-2'-methyldiphenylamine, 4-amino-2'-methoxydiphenylamine, 4-amino-2'-ethoxydiphenylamine, 4-amino-2'-phenoxydiphenylamine, 4-amino-2'-chlorodiphenylamine, 4-amino-3'-methyldiphenylamine, 4-amino-3'-chlorodiphenylamine, 4-amino-4'-methyldiphenylamine, 4-amino-4'-methoxydiphenylamine, 4-amino-4'-ethoxydiphenylamine, 4-amino-4'-phenoxydiphenylamine, 4-amino-4'-chlorodiphenylamine, 4-amino-3'-methyl-4'-methoxydiphenylamine, 4-amino-3'-methyl-6'-methoxydiphenylamine, 4-amino-2'-methyl-4'-chlorodiphenylamine, 4-amino-2'-methyl-5'-chlorodiphenylamine, 4-amino-3'-methyl-6'-chlorodiphenylamine, 4-amino-4'-methyl-3'-chlorodiphenylamine, 4-amino-2'-methoxy-4'-chlorodiphenylamine, 4-amino-3'.4'-dichlorodiphenylamine and 4-aminophenyl-β-naphthylamine.

As azocomponents there may be used for instance the 2.3-hydroxynaphthoylderivatives of aniline, of toluidines, of aminoethylbenzene, of the alkyl-, aralkyl- and arylethers of aminophenols, of aminophenylketones, -sulfones and sulfamines, of the halogensubstitution products of the aforesaid compounds, of naphthylamines and their derivatives, of arylenediamines, diaminodiaryls and their derivatives, diamines, in which two arylresidues are united by a further complex, further such arylamides of 2.3-hydroxynaphthoic acid containing further substituents with the exception of sulfonic or carboxylic acid groups in the hydroxynaphthoylresidue such as arylamides of 6-bromo-2.3-hydroxynaphthoic acid. The dyestuff formation may be carried out in an acid neutral or alkaline solution. For dyeing cotton goods by means of a standard bath it is of an advantage to use neutral nitrosodiazosolutions and to add to these solutions agents, which are suitable to neutralize the caustic alkali solution present in the padding solution of the arylides of 2.3-hydroxynaphthoic acid, such as magnesium or zinc sulfate.

In order to further illustrate our invention the following examples are given, the parts being by weight and all temperatures in centigrade degrees, but we wish it to be understood that we are not limited to the particular products nor reaction conditions mentioned therein.

Example 1

21,4 parts of 4-amino-4'-methoxy-diphenylamine are diazotized in the usual manner with 57 parts of hydrochloric acid 20° Bé and 15,2 parts of sodium nitrite at about 5–10°, whereby simultaneously a nitrosogroup is introduced. The free mineral acid is nearly neutralized with sodium acetate and the solution of the 4'-methoxy-N-nitrosodiphenylamine-4-diazonium chloride thus obtained is allowed to run at about 5–10° into a suspension obtained by dissolving 26,3 parts of the anilide of 2.3-hydroxynaphthoic acid in a sufficient quantity of a caustic soda solution with the addition of Turkey red oil and 400 parts of water and precipitating the solution by adding acetic acid. When the combination is complete the dyestuff formed is filtered off and boiled for some time in form of a paste, without drying the separated dyestuff, with about 400 parts of a solution containing 3 gms. of sodium sulfide cryst. in presence of an emulsifying agent such as 3 gms. of soap in the liter. In this manner a dark blue pigment dyestuff is obtained by splitting off the nitrosogroup. The dyestuff thus obtained corresponds probably to the formula:

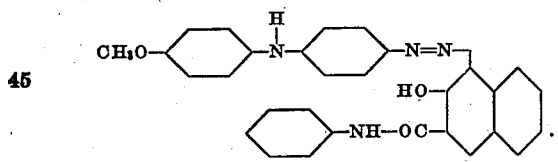

Example 2

6 gms. of the anilide of 2.3-hydroxynaphthoic acid are well ground with 6 cc. of Turkey red oil and 9 cc. of a caustic soda solution of 34° Bé and they are dissolved by adding 90 cc. of boiling water, then 90 cc. of cold water and at about 45° C. 6 cc. of formaldehyde of 33% are added. After 5 to 10 minutes the whole is made up with cold water to 1 liter of liquor.

Cotton yarn is handled at about 30° for half an hour in this padding solution, centrifugated and then developed in the following bath:

2,24 gms. of 4-amino-diphenylamine sulfate are mixed with 10 cc. of hot water and 3 cc. of hydrochloric acid of 20° Bé, then 50 cc. of ice water and 1,42 gms. of sodiumnitrite are added and the mass is allowed to stand for half an hour while stirring. Then 2,5 gms. of magnesium sulfate or the corresponding amount of zinc sulfate dissolved in water and 1 gm. of sodium bicarbonate are added and the whole is made up with cold water to 1 liter of liquor.

The padded material is treated in this developing solution for half an hour and well rinsed.

Then the well rinsed dye-goods are treated for half an hour at about 90° in a bath containing 3 gms. of soap, 3 gms. of calcinated carbonate of soda and 3 gms. of cryst. sodium sulfide in the liter, well rinsed and dried. The dyestuff thus produced corresponds probably to the formula:

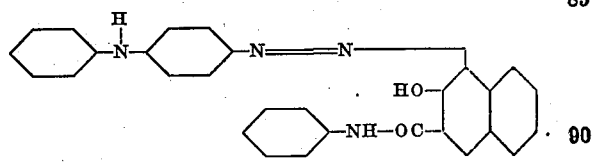

A beautiful blue dyeing of an excellent fastness is thus obtained.

Example 3

Well boiled cotton yarn is impregnated with a solution containing 4 gms. of 2.3-hydroxynaphthoyl-4-chloroaniline, 10 cc. of Turkey red oil and 8 cc. of a caustic soda solution of 34° Bé in the liter and well wrung out. 22,8 gms. of 4-amino-4'-ethoxydiphenylamine are diazotized with addition of a sufficient amount of diluted hydrochloric acid and 14 gms. of sodium nitrite, simultaneously the nitrosocompound being formed, and the liquor of diazotization is diluted until a concentration of a hundredth mole of diazocompound in the liter.

To this solution of 4-diazo-4'-ethoxy-N-nitrosodiphenylamine an amount of sodium bicarbonate until an almost neutral reaction is added and the impregnated cotton yarn is developed therein, then cold and hot rinsed.

When treating this dyeing thereafter at 80–85° with a liquor containing 5 gms. of carbonate of soda, 3 gms. of soap and 0,5 gms. of (anhydrous) sodium sulfide in the liter, and then rinsing and drying it as usually a navy blue dyeing of an excellent fastness is obtained. The dyestuff thus produced on the fiber corresponds probably to the formula:

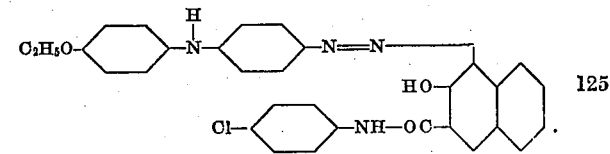

Example 4

Well boiled cotton yarn is impregnated with a solution containing 6 gms. of 2.3-hydroxynaphthoyl-4-toluidine, 8 cc. of Turkey red oil and 12 cc. of a caustic soda solution of 34° Bé in the liter and well wrung out. 21,4 gms. of 4-amino-4'-methoxydiphenylamine are diazotized in the manner described in Example 3 with 14 gms. of sodiumnitrite and the solution of the N-nitroso-4'-methoxydiphenylamine-4-diazonium chloride is made up until a concentration of 1 hundredth mole of the diazocompound in the liter.

When developing the padded cotton yarn with this N-nitroso-diazosolution neutralized with carbonate of calcium and treating it at about 90° for a quarter of an hour with a solution containing 10 gms. of carbonate of soda and 2 gms. of dextrose in the liter, a blue-dyeing of the dyestuff corresponding probably to the formula:

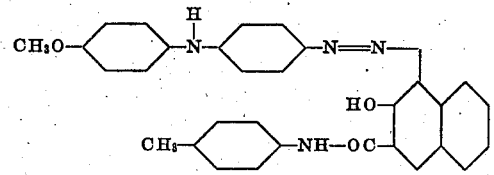

is obtained.

By using 2.3-hydroxynaphthoyl-β-naphthylamine a somewhat more reddish blue dyeing is obtained.

*Example 5*

Woolen muslin is impregnated with a solution containing 5 gms. of 2.3-hydroxynaphthoyl-4-toluidine, 5 cc. of Turkey red oil and 7,5 cc. of a caustic soda solution of 34° Bé in the liter, centrifugated and intermediately rinsed for 5–10 minutes with a solution containing 30 gms. of common salt in the liter, and then again well dehydrated.

The material is developed with a solution containing a hundredth mole of 4-diazo-4'-ethoxy-N-nitroso-diphenylamine in the liter and additioned with sodium acetate and after soaping at about 45° it is treated for about 15 minutes with a boiling liquor containing 3 cc. of formic acid of 90% in the liter. In this manner a blue dyeing is obtained. The dyestuff fixed thereby on the fiber corresponds probably to the formula:

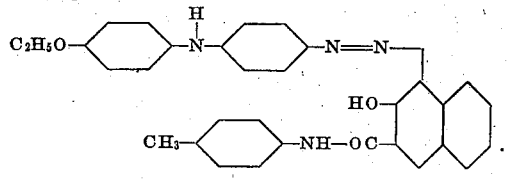

*Example 6*

3 gms. of 2.3-hydroxynaphthoyl-4-toluidine are dissolved with 6 cc. of a caustic soda solution of 34° Bé and 3 cc. of Turkey red oil with addition of 3 cc. of formaldehyde of 33% and of one of the usual protective agents, e. g. 3 gms. of Protectol I double powder (cf. Colour Index, 1924, page 363) to one liter of a padding solution.

Silk yarn is impregnated with this solution at about 25° for a quarter of an hour, then 10 gms. of common salt are added per liter of liquor and the yarn is handled for about a quarter of an hour and well dehydrated.

It is developed in a bath neutralized with sodium acetate and containing an amount of diazonitrosocompound corresponding to 1,25 gms. of 4-amino-4'-methoxy-diphenylamine after addition of 5 cc. of an acetic acid of 50% and 10 gms. of common salt per liter.

Then the silk yarn is well rinsed and treated thereafter with a boiling liquor containing 0,5 gms. of (anhydrous) sodium sulfide, 2 gms. of carbonate of soda, 3 gms. of soap and 0,5 gms. of Protectol I double powder in the liter, well rinsed in the cold and dried. A clear blue dyeing is obtained. The dyestuff thus fixed is identical with the dyestuff obtained according to Example 4.

*Example 7*

6 gms. of the anilide of 2.3-hydroxynaphthoic acid are well ground with 6 cc. of Turkey red oil and 9 cc. of a caustic soda solution of 34° Bé and they are dissolved by adding 90 cc. of boiling water, then 90 cc. of cold water and at about 45° C. 6 cc. of formaldehyde of 33% are added. After some minutes the whole is made up with cold water to 1 liter of liquor.

Cotton yarn is handled at about 30° for half an hour in this padding solution, centrifugated and then developed in the following bath:

2,65 gms. of 4-amino-4'-methoxydiphenylamine sulfate are mixed with 10 cc. of hot water and 3 cc. of hydrochloric acid of 20° Bé, then 50 cc. of ice water and 1,42 gms. of sodiumnitrite are added and the mass is allowed to stand for half an hour while stirring. Then 2,5 gms. of magnesium sulfate or the corresponding amount of zinc sulfate dissolved in water and 1 gm. of sodium bicarbonate are added and the whole is made up with cold water to 1 liter of liquor.

The padded material is treated in this developing solution for half an hour and well rinsed.

Then the well rinsed dye-goods are treated for half an hour at about 90° in a bath containing 3 gms. of soap, 3 gms. of calcinated carbonate or soda and 3 gms. of cryst. sodium sulfide in the liter, well rinsed and dried. The dye-stuff thus produced corresponds probably to the formula:

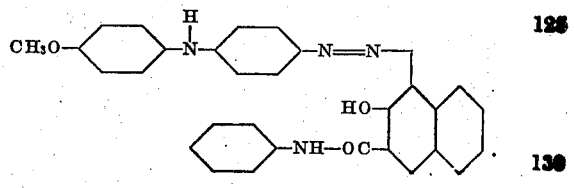

A beautiful blue dyeing of an excellent fastness is thus obtained.

Example 8

1. Padding solution:

7 gms. of 2.3-hydroxynaphthoyl-2-toluidine are well ground with 10 cc. of Turkey red oil and 11 cc. of a caustic soda solution of 34° Bé and they are dissolved by adding 105 gms. of boiling water and by boiling again the mass. Then 105 gms. of cold water and at about 50° C. 7 cc. of formaldehyde of 33% are added. After some minutes the whole is made up with cold water to 1 liter.

2. Developing bath:

2,63 gms. of 4-amino-4'-methoxydiphenylamine sulfate are stirred with 10 cc. of hot water and 3 cc. of hydrochloric acid of 20° Bé, then 50 gms. of ice-water and 1,42 gms. of sodium nitrite are added and the mass is allowed to stand for half an hour while stirring. Then 3 gms. of zinc sulfate dissolved in water and 1gm. of sodium bicarbonate are added and the nitrosodiazosolution is made up with cold water to 1 liter.

The dye goods is impregnated with the aforesaid padding solution for half an hour, centrifugated and developed at about 10° in the aforesaid developing bath for half an hour, well rinsed and thereafter treated with a bath containing soap, carbonate of soda and sodium sulfide, as described in the foregoing examples.

In this manner a beautiful greenish blue dyeing of an excellent fastness is obtained. The dyestuff thus fixed on the fiber corresponds probably to the formula:

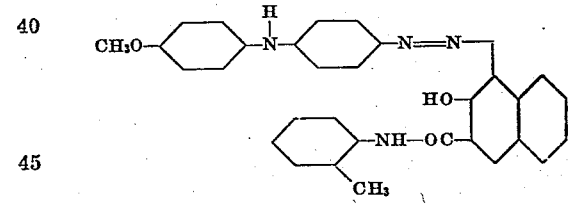

Example 9

Padding:

The cotton-piece is padded on the slop-padding-machine with a liquor prepared as follows:

15 gms. of 2.3-hydroxynaphthoyl-4-chloroaniline are mixed with 20 cc. of Turkey red oil and 24 cc. of a caustic soda solution of 34° Bé. The paste is dissolved to a clear solution by adding about 250 cc. of boiling soft water and made up with cold water to 1 liter. The temperature of impregnation is 30–35° C.

Development:

The well squeezed piece goods, which are intermediately dried in a given case, are developed on the slop-padding machine by passing through a bath of the following composition:

16 gms. of 4-amino-4'-methoxydiphenylamine are stirred with 25 cc. of hydrochloric acid of 20° Bé. and hot water and then diluted with about 500 cc. of cold water and a solution of 8,5 gms. of sodium nitrite in 50 cc. of water is added while stirring. After allowing to stand for half an hour the mass is filtered, the excess of mineral acid is nearly neutralized with 15 gms. of sodium acetate and the whole is made up with cold water to 1 liter. The temperature of development is about 15° C.

Subsequent treatment:

The piece goods are well rinsed in the cold and are allowed to pass on the open washer through a boiling liquor, containing 5 gms. of sodium sulfide, 3 gms. of soap and 2 gms. of sodium carbonate in the liter. Then the piece goods is rinsed in a hot and a cold bath.

In this manner a blue dyeing of an excellent fastness is obtained, the produced dyestuff corresponding probably to the formula:

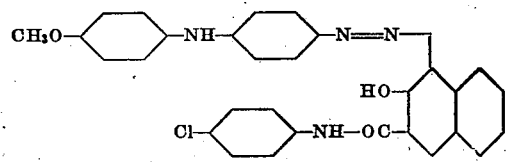

In the following table there are cited some further components suitable for the combination according to our process and the shades of dyeings obtained by the production of the dyestuffs on the fiber:

| Diazo-nitroso-compound of | Combined with | Shade of dyeing obtained |
|---|---|---|
| 4-aminodiphenylamine | 2.3-hydroxynaphthoyl-2-chloroaniline | Dark blue |
| Do. | 2.3-hydroxynaphthoyl-4-chloroaniline | Do. |
| Do. | 2.3-hydroxynaphthoyl-2-phenetidine | Do. |
| Do. | 2.3-hydroxynaphthoyl-1-naphthylamine | Do. |
| Do. | 2.3-hydroxynaphthoyl-4-chloro-2-anisidine | Reddish dark blue |
| Do. | 2.3-hydroxynaphthoyl-5-chloro-2-anisidine | Navy blue |
| Do. | 2.3-hydroxynaphthoyl-2-aminodiphenyl-ether | Blue |
| Do. | 2.3-hydroxynaphthoyl-4-amino-phenyl-benzyl-ether | Reddish blue |
| Do. | di-(2.3-hydroxynaphthoyl)-4.4'-diamino-2.2'.5.5'-tetrachloro-diphenylurea | Navy blue |
| Do. | bis-2.3-hydroxynaphthoyl-dianisidine | Dark violet |
| 4-amino-2'-methyldiphenylamine | 2.3-hydroxynaphthoyl-aminohydroquinonedimethylether | Reddish navy blue |
| Do. | 2.3-hydroxynaphthoyl-5-chloro-2-anisidine | Dark navy blue |
| Do. | 2.3-hydroxynaphthoyl-2-amino-3-naphtholmethylether | Dark reddish Navy blue |
| 4-amino-2'-methoxydiphenylamine | 2.3-hydroxynaphthoyl-4-toluidine | Dark violet. |
| Do. | 2.3-hydroxynaphthoyl-3-phenetidine | Do. |
| Do. | 2.3-hydroxynaphthoyl-2-naphthylamine | Do. |
| Do. | 2.3-hydroxynaphthoyl-2-amino-ethyl-benzene | Do. |

| Diazo-nitrosocompound of | Combined with | Shade of dyeing obtained |
|---|---|---|
| Do. | 2.3-hydroxynaphthoyl-2-amino-3-naphthol-methylether | Black-blue. |
| 4-amino-2'-ethoxydiphenylamine | 2.3-hydroxynaphthoyl-3-chloroaniline | Dark blue |
| Do. | 2.3-hydroxynaphthoyl-2-naphthylamine | Do. |
| Do. | 2.3-hydroxynaphthoyl-4-chloro-2-anisidine | Navy blue |
| Do. | 2.3-hydroxynaphthoyl-2-amino-4-chloro-1-ethylbenzene | Dark blue |
| 4-amino-2'-phenoxydiphenylamine | 2.3-hydroxynaphthoyl-4-toluidine | Dark navy blue |
| Do. | 2.3-hydroxynaphthoyl-2-phenetidine | Reddish navy blue |
| Do. | 2.3-hydroxynaphthoyl-3-chloroaniline | Navy blue |
| 4-amino-2'-chlorodiphenylamine | 2.3-hydroxynaphthoyl-3-nitroaniline | Dark blue |
| Do. | 2.3-hydroxynaphthoyl-4-chloroaniline | Dark navy blue |
| Do. | 2.3-hydroxynaphthoyl-4-amino-1-ethylbenzene | Reddish navy blue |
| Do. | 2.3-hydroxynaphthoyl-1-naphthylamine | Do. |
| 4-amino-3'-methyldiphenylamine | 2.3-hydroxynaphthoyl-2-chloroaniline | Do. |
| Do. | 2.3-hydroxynaphthoyl-5-chloro-2-anisidine | Do. |
| 4-amino-3'-chlorodiphenylamine | 2.3-hydroxynaphthoyl-3-toluidine | Navy blue |
| Do. | 2.3-hydroxynaphthoyl-2-phenetidine | Do. |
| Do. | 2.3-hydroxynaphthoyl-2-amino-3-naphthol-methylether | Black violet |
| 4-amino-4'-methyldiphenylamine | 2.3-hydroxynaphthoyl-4-toluidine | Reddish dark blue |
| Do. | 2.3-hydroxynaphthoyl-4-chloroaniline | Reddish navy blue |
| Do. | 2.3-hydroxynaphthoyl-5-chloro-2-toluidine | Do. |
| Do. | 2.3-hydroxynaphthoyl-2-naphthylamine | Do. |
| 4-amino-4'-methoxydiphenylamine | 2.3-hydroxynaphthoyl-2-anisidine | Dark blue |
| Do. | 2.3-hydroxynaphthoyl-4-anisidine | Do. |
| Do. | 2.3-hydroxynaphthoyl-3-chloroaniline | Do. |
| Do. | 2.3-hydroxynaphthoyl-5-chloro-2-toluidine | Blue |
| Do. | 2.3-hydroxynaphthoyl-5-chloro-2-anisidine | Dark blue |
| Do. | 2.3-hydroxynaphthoyl-2-naphthylamine | Reddish navy blue |
| Do. | 2.3-hydroxynaphthoyl-3-aminoacetophenone | Greenish blue |
| Do. | 2.3 - hydroxynaphthoyl - 3 - amino - 4 - methoxybenzene - sulfonic acid-dimethylamide | Blue. |
| Do. | 2.3-hydroxynaphthoyl-2-amino-tolyl-4-ethyl-sulfone | Greenish blue |
| Do. | 6-bromo-2.3-hydroxynaphthoyl-aniline | Dark blue |
| Do. | 6-bromo-2.3-hydroxynaphthoyl-5-chloro-2-anisidine | Dark navy blue |
| 4-amino-4'-ethoxydiphenylamine | 2.3-hydroxynaphthoyl-aniline | Greenish blue |
| Do. | 2.3-hydroxynaphthoyl-2-toluidine | Dark blue |
| Do. | 2.3-hydroxynaphthoyl-3-toluidine | Do. |
| Do. | 2.3-hydroxynaphthoyl-4-anisidine | Do. |
| Do. | 2.3-hydroxynaphthoyl-3-chloroaniline | Greenish blue |
| Do. | 2.3-hydroxynaphthoyl-2-naphthylamine | Reddish navy blue |
| Do. | 6-bromo-2.3-hydroxynaphthoyl-2-anisidine | Reddish dark blue |
| Do. | 6-bromo-2.3-hydroxynaphthoyl-1-naphthylamine | Greenish blue |
| Do. | di-(2.3-hydroxynaphthoyl)-2.5-diamino-4-methoxy-1-toluene | Navy Blue |
| Do. | di-(2.3-hydroxynaphthoyl)-4.4'-diamino-2.2'-dimethyl-diphenylmethane | Dark blue |
| Do. | di-(2.3-hydroxynaphthoyl)-4.4'-diaminobenzophenone | Greenish blue |
| 4-amino-4'-chlorodiphenylamine | 2.3-hydroxynaphthoyl-2-anisidine | Reddish navy blue |
| Do. | 2.3-hydroxynaphthoyl-4-anisidine | Do. |
| Do. | 2.3-hydroxynaphthoyl-5-chloro-2-anisidine | Do. |
| Do. | 2.3-hydroxynaphthoyl-2-naphthylamine | Do. |
| Do. | 2.3-hydroxynaphthoyl-2-amino-3-naphtholmethylether | Do. |
| 4-amino-4'-phenoxydiphenylamine | 2.3-hydroxynaphthoyl-4-phenetidine | Reddish dark blue |
| Do. | 2.3-hydroxynaphthoyl-4-chloroaniline | Do. |
| Do. | 2.3-hydroxynaphthoyl-1-naphthylamine | Do. |
| 4-amino-3-methyl-4'-methoxydiphenylamine | 2.3-hydroxynaphthoyl-aniline | Blue |
| Do. | 2.3-hydroxynaphthoyl-4-chloroaniline | Dark blue |
| Do. | 2.3-hydroxynaphthoyl-2-naphthylamine | Reddish navy blue |
| Do. | 2.3-hydroxynaphthoyl-4-anisidine | Dark blue |
| Do. | 2.3-hydroxynaphthoyl-2-toluidine | Do. |
| Do. | 2.3-hydroxynaphthoyl-2-chloroaniline | Reddish dark blue |
| Do. | 2.3-hydroxynaphthoyl-3-chloroaniline | Dark blue |
| 4-amino-3'-methyl-6'-methoxy-diphenylamine | 2.3-hydroxynaphthoyl-3-toluidine | Do. |
| Do. | 2.3-hydroxynaphthoyl-5-chloro-2-anisidine | Navy blue |
| Do. | 2.3-hydroxynaphthoyl-1-naphthylamine | Dark blue |
| 4-amino-2'-methyl-4'-chloro-diphenylamine | 2.3-hydroxynaphthoyl-3-toluidine | Navy blue |
| Do. | 2.3-hydroxynaphthoyl-3-nitroaniline | Dark violet |
| Do. | 2.3-hydroxynaphthoyl-aminohydroquinonedimethylether | Reddish navy blue |
| 4-amino-2'-methyl-5'-chloro-diphenylamine | 2.3-hydroxynaphthoyl-4-toluidine | Do. |
| Do. | 2.3-hydroxynaphthoyl-1-naphthylamine | Do. |
| Do. | 2.3-hydroxynaphthoyl-3-naphthylamine | Do. |
| 4-amino-3'-methyl-6'-chloro-diphenylamine | 2.3-hydroxynaphthoyl-5-chloro-2-anisidine | Dark violet |
| Do | 2.3-hydroxynaphthoyl-2-amino-4-chloro-1-ethylbenzene | Reddish navy blue |
| Do | 2.3-hydroxynaphthoyl-1-naphthylamine | Navy blue |
| 4-amino-4'-methyl-3'-chloro-diphenylamine | 2.3-hydroxynaphthoyl-aniline | Reddish navy blue |
| Do. | 2.3-hydroxynaphthoyl-2-toluidine | Do. |
| Do. | 2.3-hydroxynaphthoyl-4-toluidine | Do. |
| 4-amino-2'-methoxy-4'-chloro-diphenylamine | 2.3-hydroxynaphthoyl-aminohydroquinonedimethylether | Dark violet |
| Do | 2.3-hydroxynaphthoyl-2-naphthylamine | Dark navy blue |
| Do. | 2.3-hydroxynaphthoyl-2-amino-3-naphthol-methylether | Navy blue |
| 4 - amino - 3 - methoxy - 6.2'- dimethyl - 4'- chloro - diphenylamine | 2.3-hydroxynaphthoyl-p-chloroaniline | Violet |
| Do. | 2.3-hydroxynaphthoyl-2-naphthylamine | Do. |
| 4-amino-3'.4'-dichlorodiphenylamine | 2.3-hydroxynaphthoyl-aniline | Dark violet |
| Do. | 2.3-hydroxynaphthoyl-3-toluidine | Do. |
| Do. | 2.3-hydroxynaphthoyl-3-anisidine | Black violet |
| 4-amino-phenyl-β-naphthylamine | 2.3-hydroxynaphthoyl-aniline | Blue |
| Do. | 2.3-hydroxynaphthoyl-p-anisidine | Reddish dark blue |
| Do. | 2.3-hydroxynaphthoyl-m-chloroaniline | Do. |
| 4-amino-3.2'-dimethoxy-diphenylamine | 2.3-hydroxynaphthoyl-1-naphthylamine | Reddish blue |
| Do. | 2.3-hydroxynaphthoyl-2-naphthylamine | Do. |
| Do. | 2.3-hydroxynaphthoyl-4-chloroaniline | Do. |
| Do. | 2.3-hydroxynaphthoyl-5-chloro-2-toluidine | Do. |
| Do. | 2.3-hydroxynaphthoyl-aminohydroquinonedimethylether | Do. |
| 4-amino-3.2'-dimethyldiphenylamine | 2.3-hydroxynaphthoyl-aniline | Reddish dark blue |
| Do. | 2.3-hydroxynaphthoyl-2-naphthylamine | Do. |
| Do. | 2.3-hydroxynaphthoyl-2-toluidine | Do. |
| Do. | 2.3-hydroxynaphthoyl-2-anisidine | Do. |
| Do. | 2.3-hydroxynaphthoyl-4-chloroaniline | Do. |
| 4-amino-3.2'-dichlorodiphenylamine | 2.3-hydroxynaphthoyl-aniline | Dark violet |
| Do. | 2.3-hydroxynaphthoyl-2-naphthylamine | Do. |
| Do. | 2.3-hydroxynaphthoyl-5-chloro-2-toluidine | Do. |
| Do. | 2.3-hydroxynaphthoyl-aminohydroquinonedimethylether | Reddish dark violet |

The dyestuffs being object of the present invention can be also produced by the printing process according to one of the usual methods, it being possible to eliminate the nitrosogroup from the molecule of the dyestuffs by the steaming process.

The blue dyeings obtainable according to the present process are distinguished by an excellent ability of being discharged.

In the following claims we understand under the combining process the combination of the components in substance as well as upon a substratum, particularly on the fiber.

We claim:

1. A process which comprises combining an N-nitrosodiphenylamine-4-diazonium salt of the general formula:

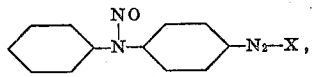

in which formula X means the acid residue of the salt and the two benzene nuclei may contain halogen-, alkyl-, oxalkyl- or oxarylgroups, with an arylamide of 2.3-hydroxynaphthoic acid, the aryl residue of which is of the benzene or naphthalene series and the naphthalene nucleus of which may contain a halogen, and splitting off the nitrosogroup from the molecule of the azodyestuffs thus formed.

2. A process which comprises combining an N-nitrosodiphenylamine-4-diazonium salt of the general formula:

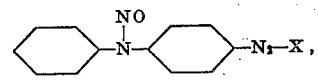

in which formula X means the acid residue of the salt and the two benzene nuclei may contain halogen-, alkyl-, oxalkyl- or oxarylgroups, with an arylamide of 2.3-hydroxynaphthoic acid, the aryl residue of which is of the benzene or naphthalene series and the naphthalene nucleus of which may contain a halogen, and splitting off the nitrosogroup from the molecule of the azodyestuffs thus formed by treating them with saponifying agents.

3. A process which comprises combining an N-nitrosodiphenylamine-4-diazonium salt of the general formula:

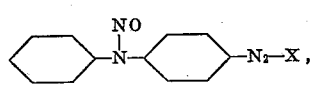

in which formula X means the acid residue of the salt and the two benzene nuclei may contain halogen-, alkyl-, oxalkyl- or oxarylgroups, with an arylamide of 2.3-hydroxynaphthoic acid, the aryl residue of which is of the benzene or naphthalene series and the naphthalene nucleus of which may contain a halogen, and splitting off the nitrosogroup from the molecule of the azodyestuffs thus formed by treating them with saponifying agents in the presence of a reducing agent.

4. A process which comprises combining an N-nitrosodiphenylamine-4-diazonium salt of the general formula:

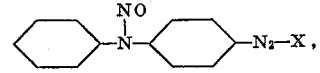

in which formula X means the acid residue of the salt and the two benzene nuclei may contain halogen-, alkyl-, oxalkyl- or oxarylgroups, with an arylamide of 2.3-hydroxynaphthoic acid, the aryl residue of which is of the benzene or naphthalene series and the naphthalene nucleus of which may contain a halogen, and splitting off the nitrosogroup from the molecule of the azodyestuffs thus formed by treating them with saponifying agents in the presence of a reducing and an emulsifying agent.

5. A process which comprises combining an N-nitrosodiphenylamine-4-diazonium salt of the general formula:

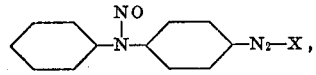

in which formula X means the acid residue of the salt and the two benzene nuclei may contain halogen-, alkyl-, oxalkyl- or oxarylgroups, with an arylamide of 2.3-hydroxynaphthoic acid, the aryl residue of which is of the benzene or naphthalene series and the naphthalene nucleus of which may contain a halogen, and splitting off the nitrosogroup from the molecule of the azodyestuffs thus formed by treating them with an alkali metal sulfide solution.

6. A process which comprises combining an N-nitrosodiphenylamine-4-diazonium salt of the general formula:

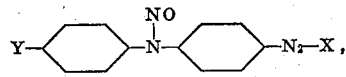

in which formula X means the acid residue of the salt and Y a substituent of the group consisting of halogen, alkyl, oxalkyl and oxaryl, and the two benzene nuclei may contain further substituents of the same grouping, with an arylamine of 2.3-hydroxynaphthoic acid, the aryl residue of which is of the benzene or naphthalene series and the naphthalene nucleus of which may contain a halogen, and splitting off the nitrosogroup from the molecule of the azodyestuffs thus formed.

7. A process which comprises combining an N-nitroso-diphenylamine-4-diazonium salt of the general formula:

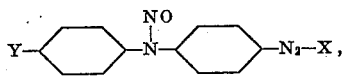

in which formula X means the acid residue of the salt and Y a substituent of the group consisting of halogen, alkyl, oxalkyl and oxaryl, and the two benzene nuclei may contain further substituents of the same grouping, with an arylamide of 2.3-hydroxynaphthoic acid, the aryl residue of which is of the benzene or naphthalene series and the naphthalene nucleus of which may contain a halogen, and splitting off the nitrosogroup from the molecule of the azodyestuffs thus formed by treating them with saponifying agents.

8. A process which comprises combining an N-nitrosodiphenylamine-4-diazonium salt of the general formula:

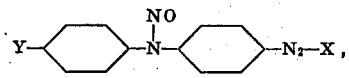

in which formula X means the acid residue of the salt and Y a substituent of the group consisting of halogen, alkyl, oxalkyl and oxaryl, and the two benzene nuclei may contain further substituents of the same grouping, with an arylamide of 2.3-hydroxynaphthoic acid, the aryl residue of which is of the benzene or naphthalene series and the naphthalene nucleus of which may contain a halogen, and splitting off the nitrosogroup from the molecule of the azodyestuffs thus formed by treating them with saponifying agents in the presence of a reducing agent.

9. A process which comprises combining an N-nitrosodiphenylamine-4-diazonium salt of the general formula:

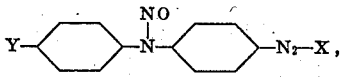

in which formula X means the acid residue of the salt and Y a substituent of the group consisting of halogen, alkyl, oxalkyl and oxaryl, and the two benzene nuclei may contain further substituents of the same grouping, with an arylamide of 2.3-hydroxynaphthoic acid, the aryl residue of which is of the benzene or naphthalene series and the naphthalene nucleus of which may contain a halogen, and splitting off the nitrosogroup from the molecule of the azodyestuffs thus formed by treating them with saponifying agents in the presence of a reducing and an emulsifying agent.

10. A process which comprises combining an N-nitrosodiphenylamine-4-diazonium salt of the general formula:

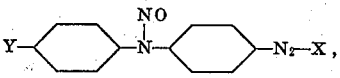

in which formula X means the acid residue of the salt and Y a substituent of the group consisting of halogen, alkyl, oxalkyl and oxaryl, and the two benzene nuclei may contain further substituents of the same grouping, with an arylamide of 2.3-hydroxynaphthoic acid, the aryl residue of which is of the benzene or naphthalene series and the naphthalene nucleus of which may contain a halogen, and splitting off the nitrosogroup from the molecule of the azodyestuffs thus formed by treating them with an alkali metal sulfide solution.

11. A process which comprises combining an N-nitrosodiphenylamine-4-diazonium salt of the general formula:

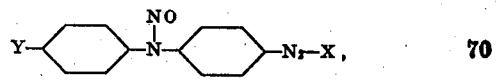

in which formula X means the acid residue of the salt and Y a substituent of the group consisting of halogen, alkyl, oxalkyl and oxaryl, with a phenylamide of 2.3-hydroxynaphthoic acid of the general formula:

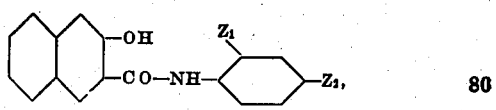

in which formula $Z_1$ and $Z_2$ mean hydrogen, halogen or an alkyl- or oxalkylgroup, and splitting off the nitrosogroup from the molecule of the azodyestuffs thus formed.

12. A process which comprises combining an N-nitrosodiphenylamine-4-diazonium salt of the general formula:

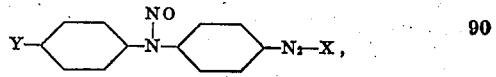

in which formula X means the acid residue of the salt and Y a substituent of the group consisting of halogen, alkyl, oxalkyl and oxaryl, with a phenylamide of 2.3-hydroxynaphthoic acid of the general formula:

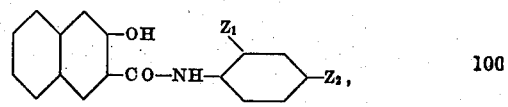

in which formula $Z_1$ and $Z_2$ mean hydrogen, halogen or an alkyl- or oxalkylgroup, and splitting off the nitrosogroup from the molecule of the azodyestuffs thus formed by treating them with saponifying agents.

13. A process which comprises combining an N-nitrosodiphenylamine-4-diazonium salt of the general formula:

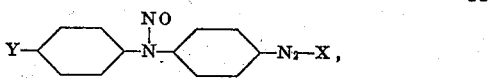

in which formula X means the acid residue of the salt and Y a substituent of the group consisting of halogen, alkyl, oxalkyl and oxaryl, with a phenylamide of 2.3-hydroxynaphthoic acid of the general formula:

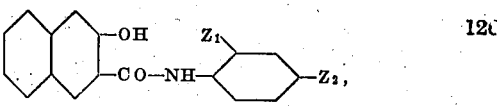

in which formula $Z_1$ and $X_2$ mean hydrogen, halogen or an alkyl- or oxalkylgroup, and splitting off the nitrosogroup from the molecule of the azodyestuffs thus formed by treating them with saponifying agents in the presence of a reducing agent.

14. A process which comprises combining an N-nitrosodiphenylamine-4-diazonium salt of the general formula:

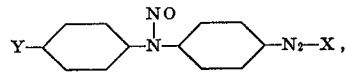

in which formula X means the acid residue of the salt and Y a substituent of the group consisting of halogen, alkyl, oxalkyl and oxaryl, with a phenylamide of 2.3-hydroxynaphthoic acid of the general formula:

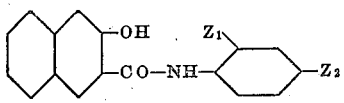

in which formula $Z_1$ and $Z_2$ mean hydrogen, halogen or an alkyl- or oxalkylgroup, and splitting off the nitrosogroup from the molecule of the azodyestuffs thus formed by treating them with saponifying agents in the presence of a reducing and an emulsifying agent.

15. A process which comprises combining an N-nitrosodiphenylamine-4-diazonium salt of the general formula:

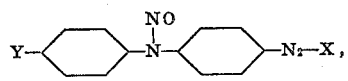

in which formula X means the acid residue of the salt and Y a substituent of the group consisting of halogen, alkyl, oxalkyl and oxaryl, with a phenylamide of 2.3-hydroxynaphthoic acid of the general formula:

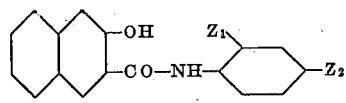

in which formula $Z_1$ and $Z_2$ mean hydrogen, halogen or an alkyl- or oxalkylgroup, and splitting off the nitrosogroup from the molecule of the azodyestuffs thus formed by treating them with an alkali metal sulfide solution.

16. A process which comprises combining an N-nitrosodiphenylamine-4-diazonium salt of the formula:

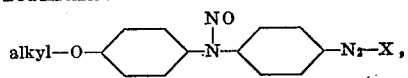

wherein X means the acid residue of the salt with a phenylamide of 2.3-hydroxynaphthoic acid of the general formula:

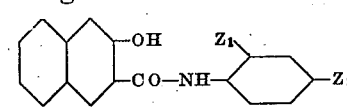

in which formula $Z_1$ and $Z_2$ mean hydrogen, halogen or an alkyl- or oxalkylgroup, and splitting off the nitrosogroup from the molecule of the azodyestuffs thus formed.

17. A process which comprises combining an N-nitrosodiphenylamine-4-diazonium salt of the formula:

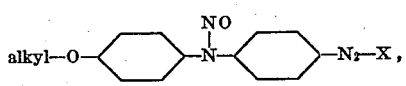

wherein X means the acid residue of the salt with a phenylamide of 2.3-hydroxynaphthoic acid of the general formula:

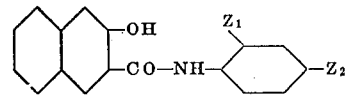

in which formula $Z_1$ and $Z_2$ mean hydrogen, halogen or an alkyl- or oxalkylgroup, and splitting off the nitrosogroup from the molecule of the azodyestuffs thus formed by treating them with saponifying agents.

18. A process which comprises combining an N-nitrosodiphenylamine-4-diazonium salt of the formula:

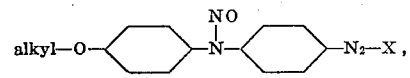

wherein X means the acid residue of the salt with a phenylamide of 2.3-hydroxynaphthoic acid of the general formula:

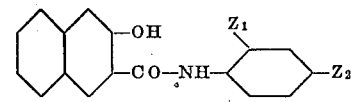

in which formula $Z_1$ and $Z_2$ mean hydrogen, halogen or an alkyl- or oxalkylgroup, and splitting off the nitrosogroup from the molecule of the azodyestuffs thus formed by treating them with saponifying agents in the presence of a reducing agent.

19. A process which comprises combining an N-nitrosodiphenylamine-4-diazonium salt of the formula:

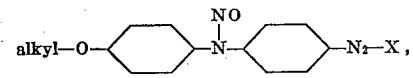

wherein X means the acid residue of the salt with a phenylamide of 2.3-hydroxynaphthoic acid of the general formula:

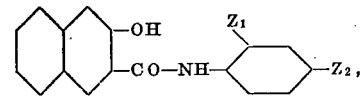

in which formula $Z_1$ and $Z_2$ mean hydrogen, halogen or an alkyl- or oxalkylgroup, and splitting off the nitrosogroup from the molecule of the azodyestuffs thus formed by treating them with saponifying agents in the presence of a reducing and an emulsifying agent.

20. A process which comprises combining an N-nitrosodiphenylamine-4-diazonium salt of the formula:

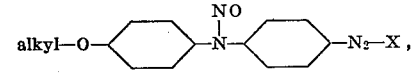

wherein X means the acid residue of the salt with a phenylamide of 2.3-hydroxynaphthoic acid of the general formula:

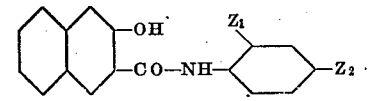

in which formula $Z_1$ and $Z_2$ mean hydrogen, halogen or an alkyl- or oxalkylgroup, and splitting off the nitrosogroup from the molecule of the azodyestuffs thus formed by treating them with an alkali metal sulfide solution.

21. A process which comprises combining an N-nitrosodiphenylamine-4-diazonium salt of the formula:

wherein X means the acid residue of the salt, with a phenylamide of 2.3-hydroxynaphthoic acid of the general formula:

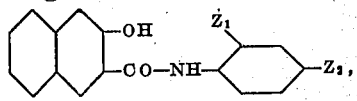

in which formula $Z_1$ and $Z_2$ mean hydrogen, halogen or an alkyl- or oxalkylgroup, and splitting off the nitrosogroup from the molecule of the azodyestuffs thus formed.

22. A process which comprises combining an N-nitrosodiphenylamine-4-diazonium salt of the formula:

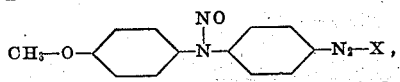

wherein X means the acid residue of the salt, with a phenylamide of 2.3-hydroxynaphthoic acid of the general formula:

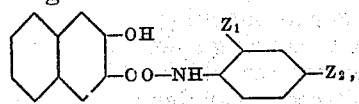

in which formula $Z_1$ and $Z_2$ mean hydrogen, halogen or an alkyl- or oxalkylgroup, and splitting off the nitrosogroup from the molecule of the azodyestuffs thus formed by treating them with saponifying agents.

23. A process which comprises combining an N-nitrosodiphenylamine-4-diazonium salt of the formula:

wherein X means the acid residue of the salt, with a phenylamide of 2.3-hydroxynaphthoic acid of the general formula:

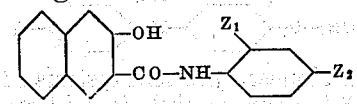

in which formula $Z_1$ and $Z_2$ mean hydrogen, halogen or an alkyl- or oxalkylgroup, and splitting off the nitrosogroup from the molecule of the azodyestuffs thus formed by treating them with saponifying agents in the presence of a reducing agent.

24. A process which comprises combining an N-nitrosodiphenylamine-4-diazonium salt of the formula:

wherein X means the acid residue of the salt, with a phenylamide of 2.3-hydroxynaphthoic acid of the general formula:

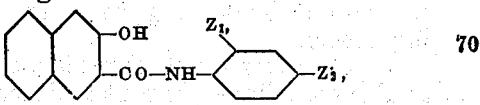

in which formula $Z_1$ and $Z_2$ mean hydrogen, halogen or an alkyl- or oxalkylgroup, and splitting off the nitrosogroup from the molecule of the azodyestuffs thus formed by treating them with saponifying agents in the presence of a reducing and an emulsifying agent.

25. A process which comprises combining an N-nitrosodiphenylamine-4-diazonium salt of the formula:

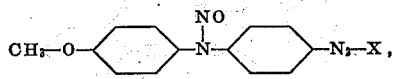

wherein X means the acid residue of the salt, with a phenylamide of 2.3-hydroxynaphthoic acid of the general formula:

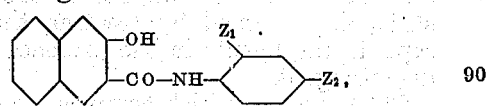

in which formula $Z_1$ and $Z_2$ mean hydrogen, halogen or an alkyl- or oxalkylgroup, and splitting off the nitrosogroup from the molecule of the azodyestuffs thus formed by treating them with an alkali metal sulfide solution.

26. A process which comprises combining an N-nitrosodiphenylamine-4-diazonium salt of the formula:

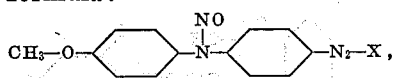

wherein X means the acid residue of the salt, with a phenylamide of 2.3-hydroxynaphthoic acid of the formula:

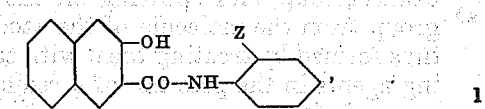

wherein Z means hydrogen or an alkyl- or oxalkylgroup, and splitting off the nitrosogroup from the molecule of the azodyestuffs thus formed.

27. A process which comprises combining an N-nitrosodiphenylamine-4-diazonium salt of the formula:

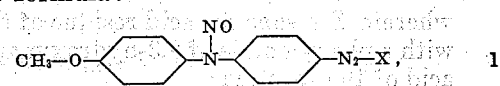

wherein X means the acid residue of the salt, with a phenylamide of 2.3-hydroxy naphthoic acid of the formula:

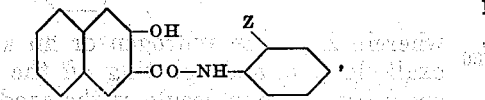

wherein Z means hydrogen or an alkyl- or oxalkylgroup, and splitting off the nitrosogroup from the molecule of the azodyestuffs thus formed by treating them with saponifying agents.

28. A process which comprises combining an N-nitrosodiphenylamine-4-diazonium salt of the formula:

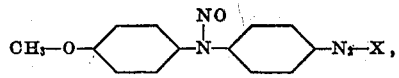

wherein X means the acid residue of the salt, with a phenylamide of 2.3-hydroxynaphthoic acid of the formula:

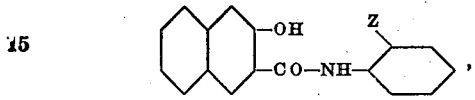

wherein Z means hydrogen or an alkyl- or oxalkylgroup, and splitting off the nitrosogroup from the molecule of the azodyestuffs thus formed by treating them with saponifying agents in the presence of a reducing agent.

29. A process which comprises combining an N-nitrosodiphenylamine-4-diazonium salt of the formula:

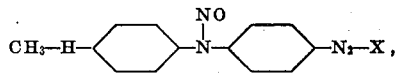

wherein X means the acid residue of the salt, with a phenylamide of 2.3-hydroxynaphthoic acid of the formula:

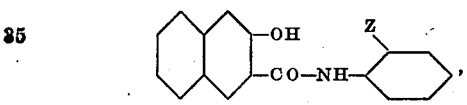

wherein Z means hydrogen or an alkyl- or oxalkylgroup, and splitting off the nitrosogroup from the molecule of the azodyestuffs thus formed by treating them with saponifying agents in the presence of a reducing and an emulsifying agent.

30. A process which comprises combining an N-nitrosodiphenylamine-4-diazonium salt of the formula:

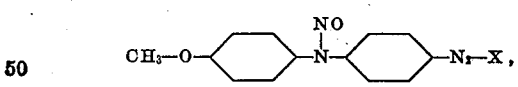

wherein X means the acid residue of the salt, with a phenylamide of 2.3-hydroxynaphthoic acid of the formula:

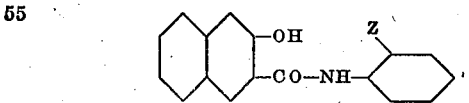

wherein Z means hydrogen or an alkyl- or oxalkylgroup, and splitting off the nitrosogroup from the molecule of the azodyestuffs thus formed by treating them with an alkali metal sulfide solution.

31. A process which comprises combining an N-nitrosodiphenylamine-4-diazonium salt of the formula:

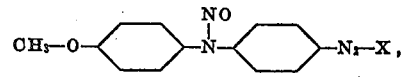

wherein X means the acid residue of the salt, with 2.3-hydroxynaphthoic acid anilide and splitting off the nitrosogroup from the molecule of the azodyestuffs thus formed.

32. A process which comprises combining an N-nitrosodiphenylamine-4-diazonium salt of the formula:

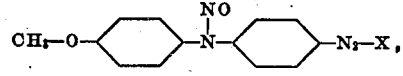

wherein X means the acid residue of the salt, with 2.3-hydroxynaphthoic acid anilide and splitting off the nitrosogroup from the molecule of the azodyestuffs thus formed by treating them with saponifying agents.

33. A process which comprises combining an N-nitrosodiphenylamine-4-diazonium salt of the formula:

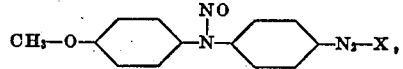

wherein X means the acid residue of the salt, with 2.3-hydroxynaphthoic acid anilide and splitting off the nitrosogroup from the molecule of the azodyestuffs thus formed by treating them with saponifying agents in the presence of a reducing agent.

34. A process which comprises combining an N-nitrosodiphenylamine-4-diazonium salt of the formula:

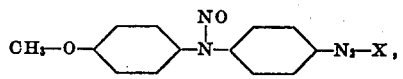

wherein X means the acid residue of the salt, with 2.3-hydroxynaphthoic acid anilide and splitting off the nitrosogroup from the molecule of the azodyestuffs thus formed by treating them with saponifying agents in the presence of a reducing and an emulsifying agent.

35. A process which comprises combining an N-nitrosodiphenylamine-4-diazonium salt of the formula:

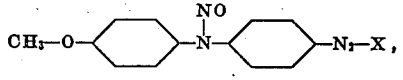

wherein X means the acid residue of the salt, with 2.3-hydroxynaphthoic acid anilide and splitting off the nitrosogroup from the molecule of the azodyestuffs thus formed by treating them with an alkali metal sulfide solution.

In testimony whereof, we affix our signatures.

LEOPOLD LASKA.
ARTHUR ZITSCHER.
WILHELM CHRIST.
ADOLF PETZOLD.